US011239746B2

United States Patent
Zhao et al.

(10) Patent No.: US 11,239,746 B2
(45) Date of Patent: Feb. 1, 2022

(54) TWO-STAGE CONVERTER AND METHOD FOR STARTING THE SAME, LLC CONVERTER, AND APPLICATION SYSTEM

(71) Applicant: SUNGROW POWER SUPPLY CO., LTD., Anhui (CN)

(72) Inventors: Tao Zhao, Hefei (CN); Fushuai Zhuang, Hefei (CN); Xinyu Wang, Hefei (CN); Jiacai Zhuang, Hefei (CN); Mingda Wang, Hefei (CN); Yuan Zhuang, Hefei (CN)

(73) Assignee: Sungrow Power Supply Co. Ltd., Anhui (CN)

(*) Notice: Subject to any disclaimer, the term of this patent is extended or adjusted under 35 U.S.C. 154(b) by 64 days.

(21) Appl. No.: 16/783,310

(22) Filed: Feb. 6, 2020

(65) Prior Publication Data
US 2020/0403496 A1 Dec. 24, 2020

(30) Foreign Application Priority Data
Jun. 24, 2019 (CN) .......................... 201910550495.8

(51) Int. Cl.
*H02M 1/36* (2007.01)
*H02M 1/08* (2006.01)
(Continued)

(52) U.S. Cl.
CPC ............... *H02M 1/36* (2013.01); *H02M 1/08* (2013.01); *H02M 3/33569* (2013.01);
(Continued)

(58) Field of Classification Search
CPC .... H02J 3/381; H02J 2300/24; H02M 7/4807; H02M 3/33569; H02M 7/4815;
(Continued)

(56) References Cited

U.S. PATENT DOCUMENTS 8,169,797 B2 * 5/2012 Coccia ................. H02M 1/4225
363/21.03
8,432,709 B2 * 4/2013 Huang ................. H02M 7/5387
363/17
(Continued)

FOREIGN PATENT DOCUMENTS

| CN | 103973092 A | 8/2014 |
| CN | 105099157 A | 11/2015 |

(Continued)

OTHER PUBLICATIONS

First Chinese Office Action dated Jan. 19, 2020, received for Application No. 201910550495.8 and English translation.
(Continued)

*Primary Examiner* — Matthew V Nguyen
(74) *Attorney, Agent, or Firm* — Conley Rose, P.C.

(57) ABSTRACT

A two-stage converter, a method for starting the two-stage converter, an LLC converter, and an application system are provided. A controller of the LLC converter of the two-stage converter first controls a main circuit of the LLC converter to perform hiccup charging on a direct current bus of a later-stage converter at a preset interval, so that the direct current bus voltage of the later-stage converter gradually increases, until an auxiliary power supply of the later-stage converter starts to operate, to supply power to the controller of the later-stage converter. After the controller of the later-stage converter reports the detected direct current bus voltage, the controller of the LLC converter determines whether the output voltage of the LLC converter increases to a hiccup starting voltage. If so, the controller of the LLC converter controls the main circuit to operate in a hiccup voltage stabilization phase.

11 Claims, 9 Drawing Sheets

(51) Int. Cl.
*H02M 3/335* (2006.01)
*H02M 7/5387* (2007.01)
*H02J 3/38* (2006.01)
*H02M 1/00* (2006.01)

(52) U.S. Cl.
CPC ........... *H02M 7/5387* (2013.01); *H02J 3/381* (2013.01); *H02J 2300/24* (2020.01); *H02M 1/007* (2021.05)

(58) Field of Classification Search
CPC ........ H02M 1/08; H02M 1/0006; H02M 1/36; H02M 1/007; H02M 3/335; H02M 7/5387; Y02E 10/56; Y02B 70/10
See application file for complete search history.

(56) References Cited

U.S. PATENT DOCUMENTS 9,544,956 B2 * 1/2017 Chen ................ H05B 45/39
2009/0152950 A1   6/2009 Zhang et al.
2014/0313790 A1 * 10/2014 Feng ................ H02M 1/36
                                                363/21.02
2015/0244166 A1   8/2015 Chen et al.
2016/0294296 A1 * 10/2016 Lee ................. H02M 1/44
2017/0170739 A1 * 6/2017 Chiang ............. H02M 3/337
2017/0310227 A1 * 10/2017 Zhang .............. H02M 3/3374

FOREIGN PATENT DOCUMENTS

| CN | 105763034 A | 7/2016 |
| CN | 106612073 A | 5/2017 |
| CN | 206673835 U | 11/2017 |
| CN | 108199573 A | 6/2018 |
| WO | 2006072216 A1 | 7/2006 |

OTHER PUBLICATIONS

Extended European Search Report dated Aug. 31, 2020, for Application No. EP 20155379.9.

* cited by examiner

TWO-STAGE CONVERTER AND METHOD FOR STARTING THE SAME, LLC CONVERTER, AND APPLICATION SYSTEM

CROSS-REFERENCE TO RELATED APPLICATIONS

The present application claims priority to Chinese Patent Application No. 201910550495.8, titled "TWO-STAGE CONVERTER AND METHOD FOR STARTING THE SAME, LLC CONVERTER, AND APPLICATION SYSTEM", filed on Jun. 24, 2019 with the Chinese Patent Office, which is incorporated herein by reference in its entirety.

FIELD

The present disclosure relates to the technical field of automatic control, and in particular to a two-stage converter and a method for starting the two-stage converter, an LLC converter, and an application system.

BACKGROUND

A two-stage converter having an LLC topology can be used to achieve isolation conversion of electric energy. For example, each module in each phase of a three-phase cascaded modular photovoltaic solid-state transformer shown in FIG. 1 includes an isolation direct current to direct current (DC/DC) converter and an H-bridge converter. In a case that the isolation DC/DC converter is implemented by an LLC converter, each module is a two-stage converter having an LLC topology. The two-stage converter having an LLC topology may have a two-level topology structure as shown in FIG. 2 or a three-level topology structure as shown in FIG. 3.

In a system shown in FIG. 1, the isolation function is performed by a high-frequency transformer of a former-stage LLC converter in each module. Further, the system can be directly connected to a medium-voltage grid of 35 kV by arranging a certain number of the modules, so that an unwieldy industrial frequency isolation transformer can be omitted, thereby decreasing a weight and a volume of the system. However, a controller of the H-bridge converter can only acquire power from a bus voltage of the H-bridge converter via a corresponding auxiliary power supply, instead of a bus voltage of the LLC converter (as shown in FIG. 4). Therefore, when starting the entire system as shown in FIG. 1, in order to enable the controller of the H-bridge converter in each module of the system, it is required to charge the direct current bus of each H-bridge converter first.

In some cases, when starting the system, the direct current bus of each H-bridge converter is usually powered via a grid by using a circuit structure as shown in FIG. 5a. A specific process is described as follows. First, a switch S1 is turned on. The grid charges the direct current bus of the H-bridge converter via a soft-start resistor R and an inductor L. When a direct current bus voltage of the H-bridge converter reaches a preset value, a switch S2 is turned on, so that the soft-start resistor R is bypassed, to decrease power loss of the system. Although this charging method is simple and reliable, the switch S2 and the soft-start resistor R are required, which increases a volume and cost of the system.

SUMMARY

A two-stage converter and a method for starting the two-stage converter, an LLC converter, and an application system are provided in the present disclosure, to solve a problem of a large volume and high cost of the system due to addition of a switch and a soft-start resistor for charging a direct current bus of an H-bridge converter.

To solve the above problem, technical solutions of the present disclosure are described as follows.

A method for starting a two-stage converter is provided according to an aspect of the present disclosure. The method for starting a two-stage converter is applied to a controller of an LLC converter of the two-stage converter and includes: controlling a main circuit of the LLC converter to perform hiccup charging on a direct current bus of a latter-stage converter at a preset time interval, to operate an auxiliary power supply of the latter-stage converter to supply power to a controller of the latter-stage converter; determining whether an output voltage of the LLC converter increases to a hiccup starting voltage based on a direct current bus voltage of the latter-stage converter, where the direct current bus voltage is detected and reported by the controller of the latter-stage converter; and controlling the main circuit of the LLC converter to operate in a hiccup voltage stabilization phase, if the output voltage of the LLC converter increases to the hiccup starting voltage.

In an embodiment, the preset time interval includes a charging section and a waiting section. The controlling a main circuit of the LLC converter to perform hiccup charging on a direct current bus of a latter-stage converter at a preset time interval includes: controlling the main circuit of the LLC converter to charge the direct current bus of the latter-stage converter during the charging section; and performing gate-driver blocking control on the main circuit of the LLC converter during the waiting section.

In an embodiment, the controlling the main circuit of the LLC converter to charge the direct current bus of the latter-stage converter includes one of: controlling, in a fixed-frequency modulation manner, a phase shift angle of each of a left bridge arm and a right bridge arm in the main circuit of the LLC converter to gradually decrease from 180°, to charge the direct current bus of the latter-stage converter; controlling, in a fixed-frequency modulation manner, a duty cycle of a drive signal of the main circuit of the LLC converter to gradually increase from zero, to charge the direct current bus of the latter-stage converter; and controlling, in a variable-frequency modulation manner, a switching frequency of the main circuit of the LLC converter to gradually decrease from a preset initial value, to charge the direct current bus of the latter-stage converter.

In an embodiment, the controlling the main circuit of the LLC converter to operate in a hiccup voltage stabilization phase includes: performing gate-driver blocking control on the main circuit of the LLC converter if the output voltage of the LLC converter increases to a hiccup peak voltage; and controlling the main circuit of the LLC converter to restart charging if the output voltage of the LLC converter decreases to a hiccup valley voltage.

In an embodiment, the controlling the main circuit of the LLC converter to restart charging includes one of: controlling, in a fixed-frequency modulation manner, a phase shift angle of each of a left bridge arm and a right bridge arm in the main circuit of the LLC converter to gradually decrease from 180°, to start charging; controlling, in a fixed-frequency modulation manner, a duty cycle of a drive signal of the main circuit of the LLC converter to gradually increase from zero, to start charging; and controlling, in a variable-frequency modulation manner, a switching frequency of the main circuit of the LLC converter to gradually decrease from a preset initial value, to start charging.

In an embodiment, after the controlling a main circuit of the LLC converter to perform hiccup charging on a direct current bus of a latter-stage converter at a preset time interval, the method for starting a two-stage converter further includes: determining whether communication information from the latter-stage converter is received; establishing a communication connection with the latter-stage converter, and performing the determining whether an output voltage of the LLC converter increases to a hiccup starting voltage based on a direct current bus voltage of the latter-stage converter, if the communication information from the latter-stage converter is received; and performing the gate-driver blocking control on the main circuit of the LLC converter if no communication information from the latter-stage converter is received in a preset time period.

In an embodiment, the preset time period is equal to N times the preset time interval, where N is a positive integer.

An LLC converter of a two-stage converter is provided according to another aspect of the present disclosure. The LLC converter of a two-stage converter includes a main circuit, an auxiliary power supply, and a controller. The controller is configured to perform any of the above described methods for starting a two-stage converter. A direct current bus at an input end of the main circuit is configured to supply power to the controller via the auxiliary power supply.

A two-stage converter is provided according to a third aspect of the present disclosure. The two-stage converter includes the above described LLC converter of a two-stage converter, and a latter-stage converter connected to an output end of the LLC converter. A controller of the LLC converter is in a communication connection with a controller of the latter-stage converter. The controller of the latter-stage converter is powered by a direct current bus at an input end of a main circuit of the latter-stage converter via another auxiliary power supply.

In an embodiment, the latter-stage converter is an H-bridge converter.

An application system is provided according to a fourth aspect of the present disclosure. The application system includes the above described two-stage converter.

In the method for starting a two-stage converter according to the present disclosure, the controller of the LLC converter of the two-stage converter first controls the main circuit of the LLC converter to perform the hiccup charging on the direct current bus of the latter-stage converter at a preset time interval, so that the direct current bus voltage of the latter-stage converter gradually increases, until the auxiliary power supply of the latter-stage converter starts to operate, so as to supply power to the controller of the latter-stage converter. After the controller of the latter-stage converter reports the detected direct current bus voltage of the latter-stage converter, the controller of the LLC converter determines whether the output voltage of the LLC converter increases to a hiccup starting voltage based on the received direct current bus voltage of the latter-stage converter. If the output voltage of the LLC converter increases to the hiccup starting voltage, the controller of the LLC converter controls the main circuit of the LLC converter to operates in a hiccup voltage stabilization phase, so as to provide a stable direct current bus voltage to the latter-stage converter by the LLC converter instead of the switch and the soft-start resistor otherwise required, which increase the volume and the cost of the system.

BRIEF DESCRIPTION OF THE DRAWINGS

In order to more clearly illustrate technical solutions in embodiments of the present disclosure, the drawings to be used in the description of the embodiments are briefly described below. Apparently, the drawings in the following description show only some embodiments of the present disclosure, and other drawings may be obtained by those skilled in the art from the drawings without any creative work.

DETAILED DESCRIPTION OF EMBODIMENTS

Technical solutions in the embodiments of the present disclosure are described clearly and completely in conjunction with the drawings in the embodiments of the present disclosure hereinafter. It is apparent that the described embodiments are only some embodiments of the present disclosure, rather than all embodiments. All other embodiments obtained by those skilled in the art based on the embodiments of the present disclosure without any creative work fall within the protection scope of the present disclosure.

When starting a system of a two-stage converter, a voltage of a direct current bus at an input side of a latter-stage converter (for example, H-bridge converters in FIG. 2 and FIG. 3) is zero or cannot reach a starting voltage of an auxiliary power supply of the latter-stage converter. Therefore, a controller of the latter-stage converter cannot operate normally, and thus the direct current bus voltage of the latter-stage converter cannot be sampled or communicated, so that a controller of an LLC converter cannot acquire an output voltage of the LLC converter. In this scenario, neither the controller of the LLC converter nor the controller of the latter-stage converter can sample the output voltage of the LLC converter or perform software protection on the output voltage of the LLC converter, and a hardware protection circuit cannot operate normally.

Figure 2:
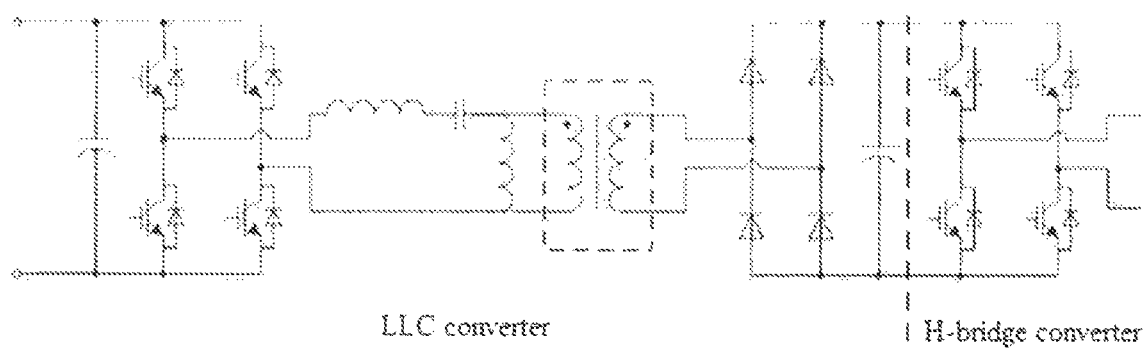
FIGS. 2 and 3 are two circuit diagrams of a two-stage converter.
Figure 3:
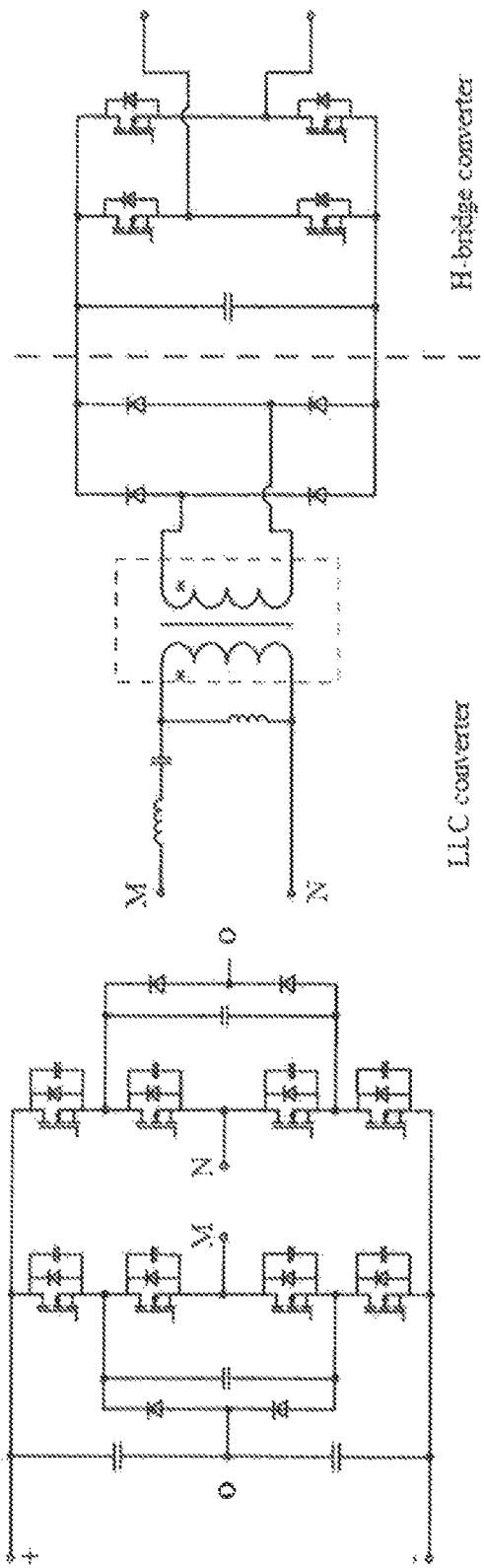

In this case, the LLC converter operates in a no-load starting mode. In a case that the system is not protected, an improper starting may easily result in an overvoltage of the output voltage and damage to a device. In order to avoid the above case and to solve the problem of a large volume and high cost of the system due to addition of a switch and a soft-start resistor for charging a direct current bus of an H-bridge converter, a method for starting a two-stage converter is provided in the present disclosure. The method for starting a two-stage converter is applied to a controller of an LLC converter of the two-stage converter. In this two-stage converter, a converter at a former stage has an LLC topology, as shown in FIG. 2 or FIG. 3. Apparently, the converter at the former stage may also be in other forms, which is not limited herein.

Figure 6A:
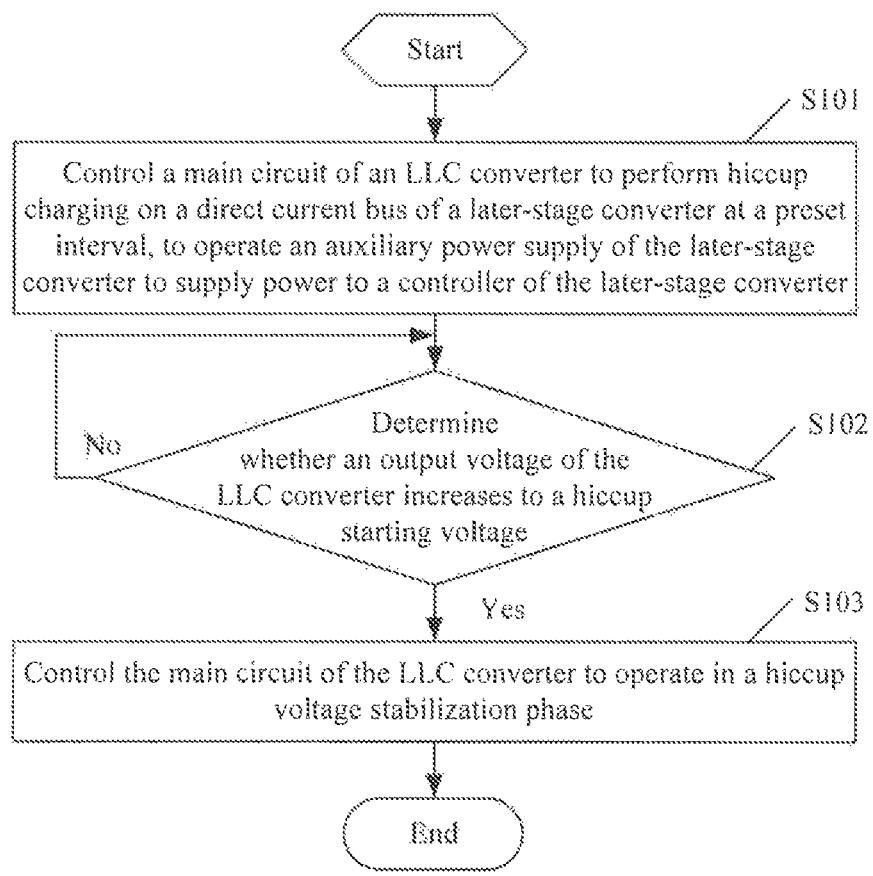
FIGS. 6a and 6b are flowcharts of a method for starting a two-stage converter according to embodiments of the present disclosure.

Referring to FIG. 6a, the method for starting a two-stage converter includes the following steps S101 to S103.

In step S101, a main circuit of the LLC converter is controlled to perform hiccup charging on a direct current bus of a latter-stage converter at a preset time interval, to operate an auxiliary power supply of the latter-stage converter to supply power to a controller of the latter-stage converter.

The auxiliary power supply of the controller of the latter-stage converter requires a certain time period, usually a few seconds, to be started. Therefore, in step S101 of this embodiment, by charging in the hiccup manner, an intermittent charging including charging and waiting is performed on the direct current bus of the latter-stage converter at the preset time interval, to avoid a case that the output voltage of the LLC converter increases too fast to start the auxiliary power supply of the latter-stage converter.

Figure 7:
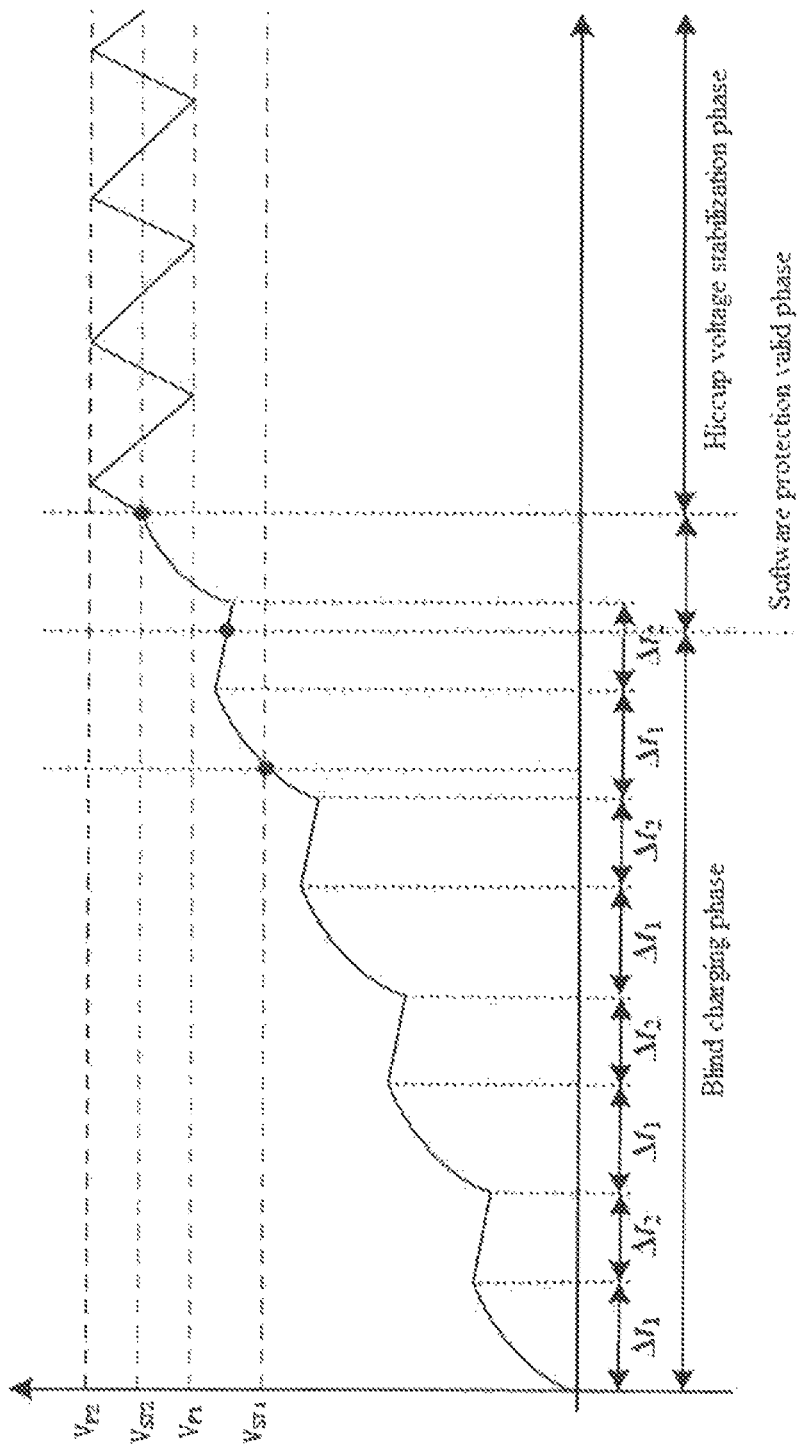
FIG. 7 is a schematic diagram showing a waveform of an output voltage of an LLC converter according to an embodiment of the present disclosure.

Referring to FIG. 7, the preset time interval includes a charging section (as a time period denoted by $\Delta t_1$ in FIG. 7) and a waiting section (as a time period denoted by $\Delta t_2$ in FIG. 7). In this step, the main circuit of the LLC converter is controlled to perform hiccup charging on a direct current bus of a latter-stage converter at a preset time interval in a way of controlling the main circuit of the LLC converter to charge the direct current bus of the latter-stage converter during the charging section, and performing gate-driver blocking control on the main circuit of the LLC converter during the waiting section. The gate-driver blocking control on the main circuit of the LLC converter refers to controlling all switches in the main circuit of the LLC converter to be turned off.

In some embodiments, the main circuit of the LLC converter is controlled to charge the direct current bus of the latter-stage converter during the charging section in one of the following ways of controlling, in a fixed-frequency modulation manner, a phase shift angle of each of a left bridge arm and a right bridge arm in the main circuit of the LLC converter to gradually decrease from 180°, to charge the direct current bus of the latter-stage converter; controlling, in a fixed-frequency modulation manner, a duty cycle of a drive signal of the main circuit of the LLC converter to gradually increase from zero, to charge the direct current bus of the latter-stage converter; and controlling, in a variable-frequency modulation manner, a switching frequency of the main circuit of the LLC converter to gradually decrease from a preset initial value, to charge the direct current bus of the latter-stage converter.

That is, at a beginning of each charging section, in a case that the LLC converter adopts the fixed-frequency modulation manner, the phase shift angle of each of the left bridge arm and the right bridge arm in the main circuit of the LLC converter is gradually decreased from 180°, or the duty cycle is gradually increased from 0. In a case that the LLC converter adopts the variable-frequency modulation manner, the switching frequency of the main circuit of the LLC converter is gradually decreased from a large preset initial value. In this way, it is avoided to have large impulses of a resonant inductor current and an output voltage of the LLC converter when starting the system, thereby achieving further protection of the system.

In step S102, whether the output voltage of the LLC converter increases to a hiccup starting voltage is determined based on a direct current bus voltage of the latter-stage converter that is detected and reported by the controller of the latter-stage converter.

In step S101, in each preset time interval, the LLC converter is started during the time period $\Delta t_1$, and is wave-blocked during the time period $\Delta t_2$. In this way, the output voltage of the LLC converter, i.e., the direct current bus voltage of the latter-stage converter, gradually increases, which presents a step-like shape including multiple time periods $\Delta t_1$ and time periods $\Delta t_2$ in a front part of FIG. 7.

The direct current bus voltage of the latter-stage converter gradually increases, and first reaches an operating voltage $V_{ST1}$ of the auxiliary power supply of the controller of the latter-stage converter. After a time period, the auxiliary power supply starts normally and supplies power to the controller of the latter-stage converter. The controller of the latter-stage converter starts to operate and establishes a communication connection with the controller of the LLC converter. Then, after detecting the direct current bus voltage of the latter-stage converter, the controller of the latter-stage converter transmits the direct current bus voltage of the latter-stage converter to the controller of the LLC converter through communication, so that the controller of the LLC converter knows the direct current bus voltage of the latter-stage converter, i.e., the output voltage of the LLC converter.

Before the communication connection is established, the controller of the LLC converter cannot know the output voltage of the LLC converter. Therefore, the LLC converter operates in a blind charging phase as shown in FIG. 7.

After receiving information transmitted by the controller of the latter-stage converter, the controller of the LLC converter performs software protection on the output voltage of the LLC converter based on the received information. That is, the LLC converter operates in a software protection valid phase shown in FIG. 7. In this phase, the controller of the LLC converter always determines whether the output voltage of the LLC converter increases to a hiccup starting voltage $V_{ST2}$. If the output voltage of the LLC converter increases to the hiccup starting voltage $V_{ST2}$, step S103 is performed.

In step S103, the main circuit of the LLC converter is controlled to operate in a hiccup voltage stabilization phase.

In the hiccup voltage stabilization phase shown in FIG. 7, when the controller of the LLC converter detects through communication that the output voltage of the LLC converter increases to a hiccup peak voltage $V_{P2}$, the gate-driver blocking control is performed on the main circuit of the LLC converter. Due to consumption by the auxiliary power supply of the latter-stage converter, the output voltage of the LLC converter decreases. When the output voltage of the LLC converter decreases to a hiccup valley voltage $V_{P1}$, the controller of the LLC converter controls the main circuit of the LLC converter to restart charging. The process is repeated so that the output voltage of the LLC converter can be stabilized in a certain range.

In some embodiments, similar to the hiccup charging during the blind charging phase, the main circuit of the LLC converter is controlled to restart charging in one of the following ways of controlling, in a fixed-frequency modulation manner, a phase shift angle of each of a left bridge arm and a right bridge arm in the main circuit of the LLC converter to gradually decrease from 180°, to start charging; controlling, in a fixed-frequency modulation manner, a duty cycle of a drive signal of the main circuit of the LLC converter to gradually increase from zero, to start charging; and controlling, in a variable-frequency modulation manner, a switching frequency of the main circuit of the LLC converter to gradually decrease from a preset initial value, to start charging.

That is, every time when the LLC converter restarts charging in the hiccup voltage stabilization phase, in a case that the LLC converter adopts the fixed-frequency modulation manner, the phase shift angle of each of the left bridge arm and the right bridge arm in the main circuit of the LLC converter is gradually decreased from 180°, or the duty cycle is gradually increased from 0. In a case that the LLC converter adopts the variable-frequency modulation manner, the switching frequency of the main circuit of the LLC converter is gradually decreased from a large preset initial value. In this way, it is avoided to have large impulses of the resonant inductor current and the output voltage of the LLC converter when starting the system. In this phase, the LLC converter can acquire the output voltage of the LLC converter through communication. Therefore, once an overvoltage is outputted, the system can be protected by software. That is, the LLC converter operates in the software protection valid phase.

With the starting method including a hiccup blind charging phase and a hiccup voltage stabilization phase, the two-stage converter having an LLC topology as shown in FIG. 2 and FIG. 3 can be started safely and smoothly without adding the switch and the soft-start resistor as previously described, thereby reducing the volume and cost of the system.

Figure 5A:
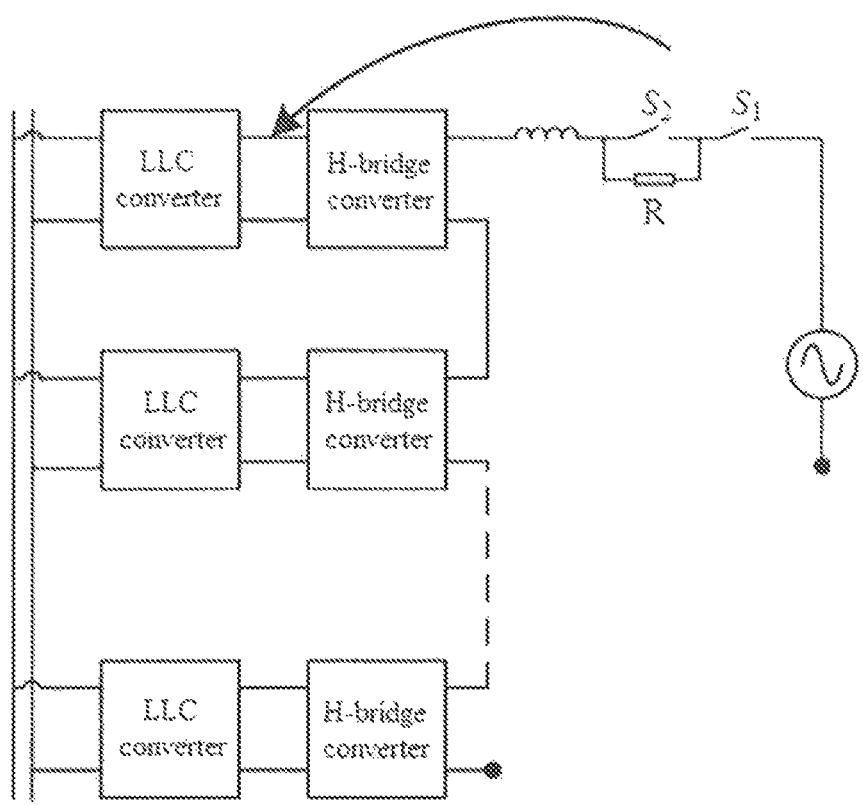
FIGS. 5a to 5c are schematic diagrams showing three methods for charging an H-bridge converter.
Figure 5B:
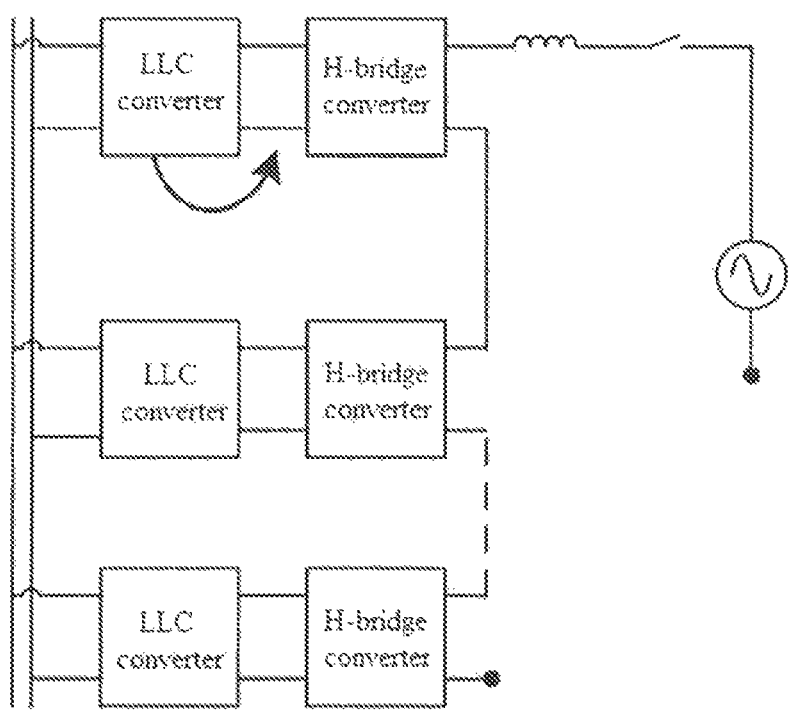
Figure 5C:
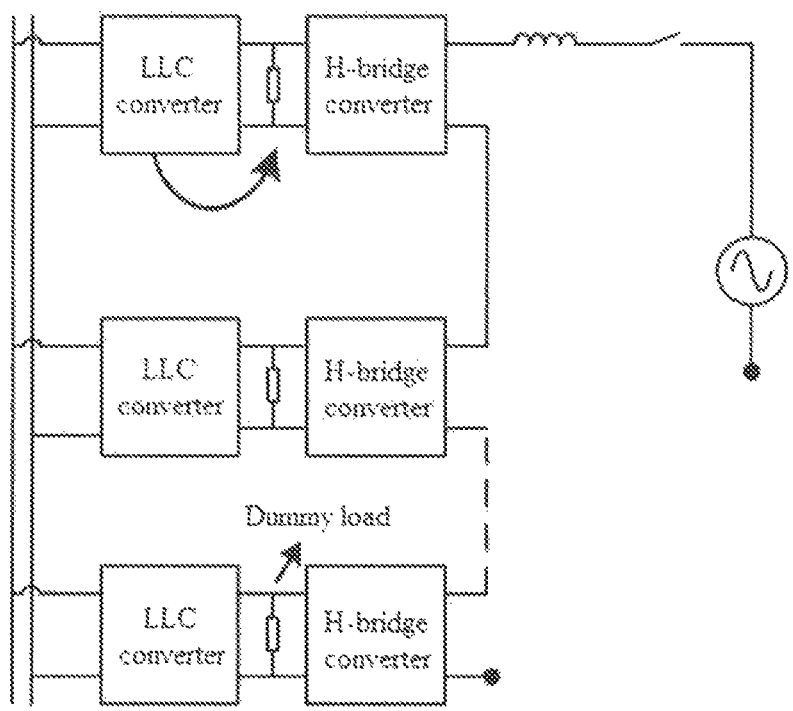

It is noted that there is also a charging solution as shown in FIG. 5b in the conventional technology. In the charging solution, a former-stage LLC converter provides a direct current bus voltage to a latter-stage converter. However, in this solution, the output voltage of the LLC converter cannot be acquired before a controller of an H-bridge converter is started. Therefore, an additional voltage detection function is required to perform voltage stabilization control and over-voltage protection. Otherwise, when directly starting the LLC converter in a case of no load or a small load, a device may be damaged instantly due to a large surge current in a short time. Further, the output voltage of the LLC converter may reach a high voltage at the instant of starting, which may result in an overvoltage of the device. Therefore, a solution as shown in FIG. 5c is provided in the conventional technology. That is, a dummy load is added to an output side of the LLC converter, so that a load of the LLC converter is increased, thereby facilitating control of the output voltage of the LLC converter when starting the system. After the system is started, the dummy load is removed to decrease unnecessary power loss of the system. However, for a high-voltage and high-power converter, an additional dummy load may increase a volume of the system, which impacts the power density of the entire converter.

However, with the method for starting a two-stage converter in the above embodiments, the direct current bus voltage of the latter-stage converter can be provided without adding any hardware. No additional voltage detection function or a dummy load is required, thereby solving a problem of high cost, a large volume or low power density of the system.

Figure 6B:
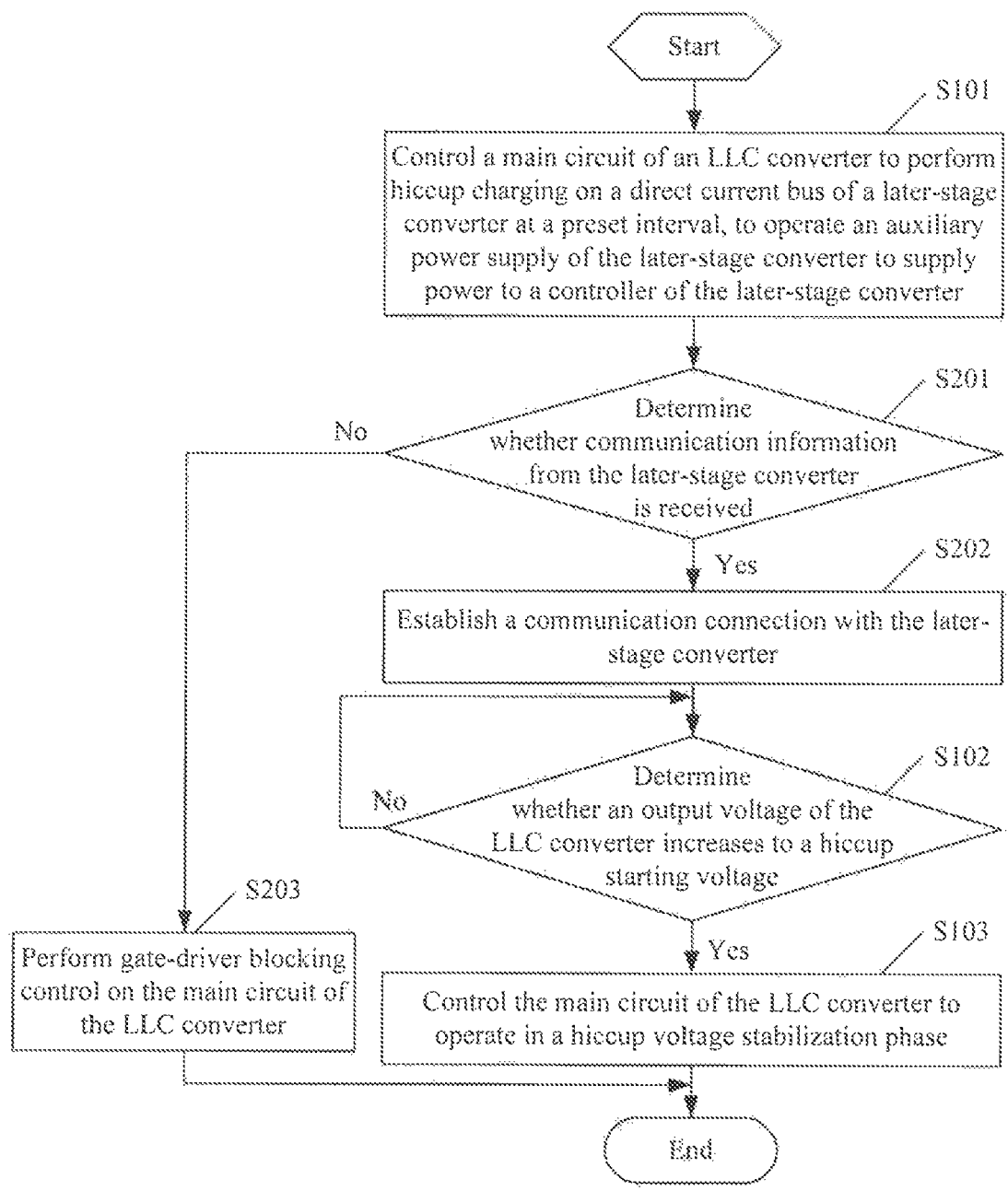

Another method for starting a two-stage converter is provided according to an embodiment of the present disclosure. Based on the above embodiments as shown in FIG. 6a and FIG. 7, in an embodiment as shown in FIG. 6b, after step S101 of controlling a main circuit of the LLC converter to perform hiccup charging on a direct current bus of a latter-stage converter at a preset time interval, the method for starting a two-stage converter further includes the following steps S201 to S203.

In step S201, it is determined whether communication information from the latter-stage converter is received.

If the communication information from the latter-stage converter is received, steps S202 and S102 are sequentially performed. If no communication information from the latter-stage converter is received in a preset time period, step S203 is performed.

In step S202, a communication connection with the latter-stage converter is established.

In step S203, the gate-driver blocking control is performed on the main circuit of the LLC converter.

In an embodiment, the preset time period is equal to N times the preset time intervals, where N is a positive integer. That is, if the controller of the LLC converter receives no communication information from the controller of the latter-stage converter in multiple consecutive time periods (Δt1+ Δt2), a fault may occur in the LLC converter, the auxiliary power supply of the latter-stage converter or the communication function between their controllers. Therefore, the gate-driver blocking control is required to be directly performed on the LLC converter. If the gate-driver blocking control is not performed in time, the output voltage of the LLC converter may reach a high voltage, which may damage a device. After receiving information from the controller of the latter-stage converter through communication, the controller of the LLC converter acquires the output voltage of the LLC converter based on the received information, and performs software protection on the output voltage of the LLC converter.

Based on the above embodiments, in this embodiment, hiccup charging including charging and waiting is performed in the blind charging phase, and if the controller of the LLC converter receives no communication information from the controller of the latter-stage converter through communication in a certain time period, it is considered that the system has a fault, thereby protecting the device from damage.

An LLC converter of a two-stage converter is further provided according to another embodiment of the present disclosure. The LLC converter of a two-stage converter includes a main circuit, an auxiliary power supply, and a controller.

Figure 4:
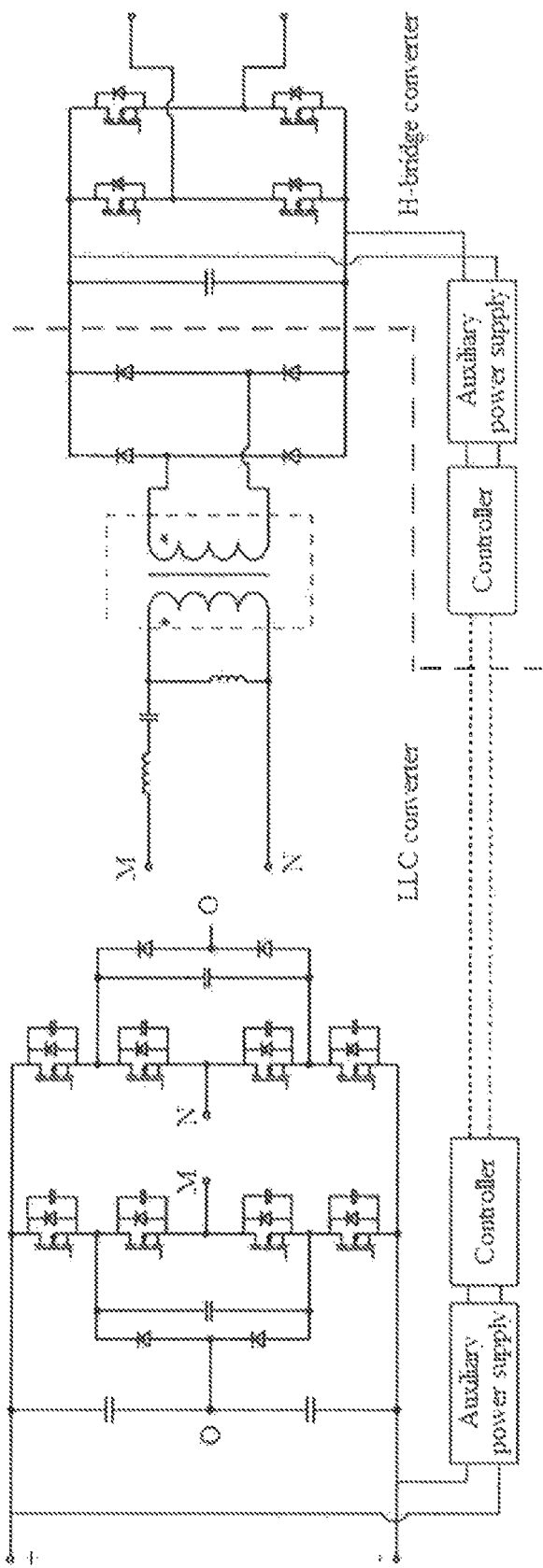
FIG. 4 is a schematic structural diagram of a two-stage converter.

A direct current bus at an input end of the main circuit is configured to supply power to the controller via the auxiliary power supply (as shown in FIG. 4).

Further, a structure of the main circuit may be as shown in FIGS. 2 to 4, or may be in other forms. Any structure of the main circuit having an LLC topology is within the protection scope of the present disclosure.

The controller is configured to perform the method for starting a two-stage converter described in any one of the above embodiments, which are not repeated herein.

A two-stage converter is further provided according to another embodiment of the present disclosure. The two-stage converter includes an LLC converter, and a latter-stage converter connected to an output end of the LLC converter.

A controller of the LLC converter is in a communication connection with a controller of the latter-stage converter.

The controller of the latter-stage converter is powered by a direct current bus at an input end of a main circuit of the latter-stage converter via another auxiliary power supply.

In an embodiment, the latter-stage converter is an H-bridge converter.

The controller of the LLC converter is as described in the above embodiments, which are not repeated herein.

The two-stage converter may be as shown in FIGS. 2 to 4. It should be noted that reference signs M, N, and O in FIGS. 3 and 4 are used to show connection relationship between nodes. In actual applications, each switch in FIGS. 2 to 4 is not limited to the form as shown, but may be implemented by an insulated gate bipolar translator (IGBT) or a metal-oxide semiconductor field effect transistor (MOS-FET), depending on specific application environment. All two-stage converters having an LLC topology and using the above described method for starting a two-stage converter are within the protection scope of the present disclosure.

Figure 1:
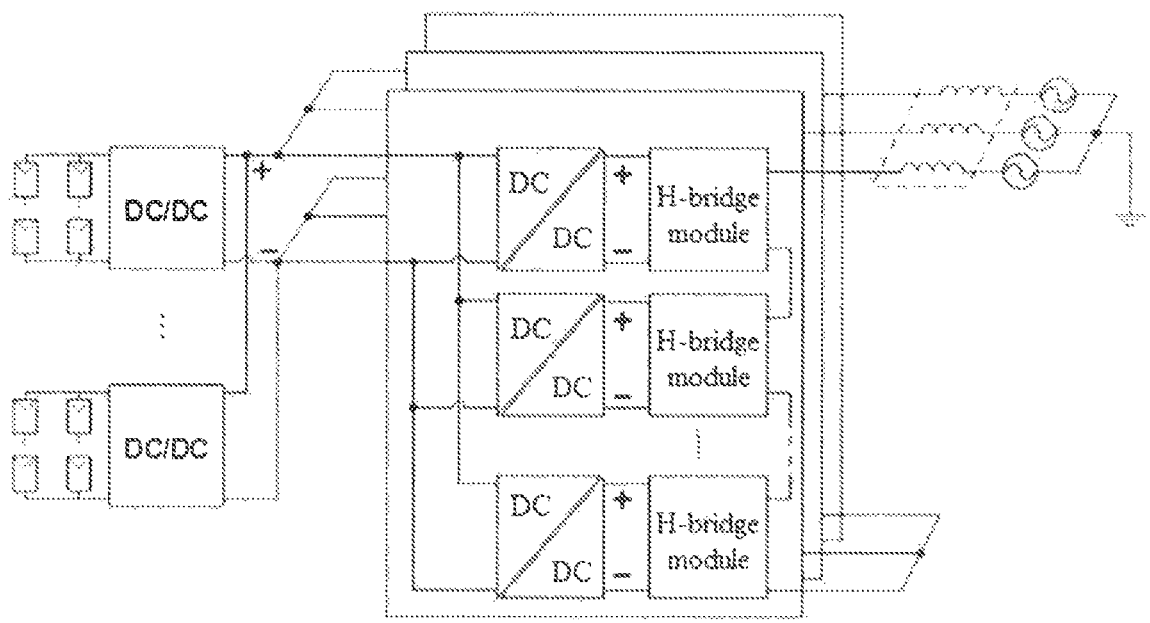
FIG. 1 is a schematic structural diagram of a three-phase cascaded modular photovoltaic solid-state transformer.

Further, any system including the two-stage converter, for example, the three-phase cascaded modular photovoltaic solid-state transformer shown in FIG. 1, is within the protection scope of the present disclosure.

The embodiments in this specification are described in a progressive way, each of which emphasizes the differences from others, and the same or similar parts among the embodiments can be referred to each other. Since the device disclosed in the embodiments corresponds to the method therein, the description thereof is relatively simple, and for relevant matters references may be made to the description of the method.

The above described embodiments are only preferred embodiments of the present disclosure and are not meant to limit the present disclosure. Those skilled in the art may make, based on the disclosed method and technical content, some variations and improvements on the technical solutions of the present disclosure, or make some equivalent variations on the embodiments without departing from the scope of the technical solutions. All simple modifications, equivalent variations and improvements made based on the technical essence fall in the scope of the technical solutions of the present disclosure.

The invention claimed is:

1. A method for starting a two-stage converter, applied to a controller of an LLC converter of the two-stage converter, and the method comprising:
controlling a main circuit of the LLC converter to perform hiccup charging on a direct current bus of a latter-stage converter at a preset time interval, to operate an auxiliary power supply of the latter-stage converter to supply power to a controller of the latter-stage converter, wherein the main circuit of the LLC converter comprises an LLC topology;
determining whether an output voltage of the LLC converter increases to a hiccup starting voltage based on a direct current bus voltage of the latter-stage converter, where the direct current bus voltage is detected and reported by the controller of the latter-stage converter to the controller of the LLC converter; and
controlling the main circuit of the LLC converter to operate in a hiccup voltage stabilization phase, if the output voltage of the LLC converter increases to the hiccup starting voltage.

2. The method for starting a two-stage converter according to claim 1, wherein
the preset time interval comprises a charging section and a waiting section; and
the controlling a main circuit of the LLC converter to perform hiccup charging on a direct current bus of a latter-stage converter at a preset time interval comprises:
controlling the main circuit of the LLC converter to charge the direct current bus of the latter-stage converter during the charging section; and
performing gate-driver blocking control on the main circuit of the LLC converter during the waiting section.

3. The method for starting a two-stage converter according to claim 2, wherein the controlling the main circuit of the LLC converter to charge the direct current bus of the latter-stage converter comprises one of:
controlling, in a fixed-frequency modulation manner, a phase shift angle of each of a left bridge arm and a right bridge arm in the main circuit of the LLC converter to gradually decrease from 180°, to charge the direct current bus of the latter-stage converter;
controlling, in a fixed-frequency modulation manner, a duty cycle of a drive signal of the main circuit of the LLC converter to gradually increase from zero, to charge the direct current bus of the latter-stage converter; and
controlling, in a variable-frequency modulation manner, a switching frequency of the main circuit of the LLC converter to gradually decrease from a preset initial value, to charge the direct current bus of the latter-stage converter.

4. The method for starting a two-stage converter according to claim 1, wherein the controlling the main circuit of the LLC converter to operate in a hiccup voltage stabilization phase comprises:
performing gate-driver blocking control on the main circuit of the LLC converter if the output voltage of the LLC converter increases to a hiccup peak voltage; and
controlling the main circuit of the LLC converter to restart charging if the output voltage of the LLC converter decreases to a hiccup valley voltage.

5. The method for starting a two-stage converter according to claim 4, wherein the controlling the main circuit of the LLC converter to restart charging comprises one of:
controlling, in a fixed-frequency modulation manner, a phase shift angle of each of a left bridge arm and a right bridge arm in the main circuit of the LLC converter to gradually decrease from 180°, to start charging;
controlling, in a fixed-frequency modulation manner, a duty cycle of a drive signal of the main circuit of the LLC converter to gradually increase from zero, to start charging; and
controlling, in a variable-frequency modulation manner, a switching frequency of the main circuit of the LLC converter to gradually decrease from a preset initial value, to start charging.

6. The method for starting a two-stage converter according to claim 1, wherein after the controlling a main circuit of the LLC converter to perform hiccup charging on a direct current bus of a latter-stage converter at a preset time interval, the method further comprises:
determining whether communication information from the latter-stage converter is received;
establishing a communication connection with the latter-stage converter, and performing the determining whether an output voltage of the LLC converter increases to a hiccup starting voltage based on a direct current bus voltage of the latter-stage converter, if the communication information from the latter-stage converter is received by the controller of the LLC converter; and
performing gate-driver blocking control on the main circuit of the LLC converter if no communication information from the latter-stage converter is received by the controller of the LLC converter in a preset time period.

7. The method for starting a two-stage converter according to claim 6, wherein the preset time period is equal to N times the preset time interval, where N is a positive integer.

8. An LLC converter of a two-stage converter, comprising:
- a main circuit, wherein the main circuit comprises an LLC topology;
- an auxiliary power supply; and
- a controller, wherein the controller is configured to:
- control the main circuit of the LLC converter to perform hiccup charging on a direct current bus of a latter-stage converter at a preset time interval, to operate an auxiliary power supply of the latter-stage converter to supply power to a controller of the latter-stage converter;
- determine whether an output voltage of the LLC converter increases to a hiccup starting voltage based on a direct current bus voltage of the latter-stage converter, wherein the direct current bus voltage is detected and reported by the controller of the latter-stage converter; and
- control the main circuit of the LLC converter to operate in a hiccup voltage stabilization phase, if the output voltage of the LLC converter increased to the hiccup starting voltage; and
- a direct current bus at an input end of the main circuit is configured to supply power to the controller of the LLC converter via the auxiliary power supply of the LLC converter.

9. A two-stage converter, comprising:
- the LLC converter according to claim 8; and
- the latter-stage converter connected to an output end of the LLC converter, wherein
- the controller of the LLC converter is in a communication connection with the controller of the latter-stage converter; and
- the controller of the latter-stage converter is powered by a direct current bus at an input end of a main circuit of the latter-stage converter via another auxiliary power supply.

10. The two-stage converter according to claim 9, wherein the latter-stage converter is an H-bridge converter.

11. An application system comprising the two-stage converter according to claim 9.

* * * * *